US010302266B2

(12) United States Patent
Luo et al.

(10) Patent No.: US 10,302,266 B2
(45) Date of Patent: May 28, 2019

(54) VEHICULAR HEADLAMP HAVING SHADE ELEMENT WITH REFLECTIVE PORTIONS

(71) Applicants: EXCELLENCE OPTOELECTRONICS INC., Miaoli County (TW); EXCELLENCE OPTOELECTRONICS (DONG GUAN) LTD., Dongguan (CN)

(72) Inventors: Yuan-Jing Luo, Miaoli County (TW); Ching-Tan Yu, Miaoli County (TW)

(73) Assignees: Excellence Optoelectronics Inc., Miaoli County (TW); Excellence Optoelectronics (Dong Guan) Ltd., Dongguan (CN)

( * ) Notice: Subject to any disclaimer, the term of this patent is extended or adjusted under 35 U.S.C. 154(b) by 0 days.

(21) Appl. No.: 15/730,921

(22) Filed: Oct. 12, 2017

(65) Prior Publication Data

US 2018/0224085 A1 Aug. 9, 2018

(30) Foreign Application Priority Data

Feb. 9, 2017 (TW) ............................ 106104311 A

(51) Int. Cl.
*B60Q 1/04* (2006.01)
*F21S 41/141* (2018.01)
(Continued)

(52) U.S. Cl.
CPC ............. *F21S 41/141* (2018.01); *F21S 2/005* (2013.01); *F21S 41/148* (2018.01); *F21S 41/25* (2018.01);
(Continued)

(58) Field of Classification Search
CPC ........ F21S 41/395; F21S 41/365; F21S 41/36; F21S 41/43; F21S 41/321; F21S 41/33; F21S 41/333; B60Q 1/04
See application file for complete search history.

(56) References Cited

U.S. PATENT DOCUMENTS 1,462,036 A * 7/1923 Graham .................... F21V 7/04
362/298
1,577,338 A * 3/1926 Merrill ...................... F21V 7/04
362/301
(Continued)

FOREIGN PATENT DOCUMENTS

JP 3205502 U 7/2016

*Primary Examiner* — Ismael Negron
(74) *Attorney, Agent, or Firm* — Rosenberg, Klein & Lee

(57) ABSTRACT

A vehicular headlamp includes a reflector, a lighting element and a shade with a reflection body. The shade is fixed to the reflector, with the reflection body extending forward from the front end of the shade. The reflection body includes a reflective surface inclined to face a front of the headlamp and a supplemental light plane inclined to face a rear of the headlamp. The lighting element emits light to the reflector, which is then reflected towards the upper surface of the shade, the reflective surface of the reflection body, and the supplemental light plane, before being projected as a main light beam towards an outside of the vehicle. The reflective surface and the supplemental light plane redirect at least a portion of light from a lower part of the main light beam and the supplemental light plane redirect at least a portion of projected on an opposite lane, an upper part of the main light beam.

10 Claims, 15 Drawing Sheets

(51) Int. Cl.

| | |
|---|---|
| ***F21S 2/00*** | (2016.01) |
| ***F21S 41/25*** | (2018.01) |
| ***F21S 41/255*** | (2018.01) |
| ***F21S 41/32*** | (2018.01) |
| ***F21S 41/43*** | (2018.01) |
| ***F21S 41/365*** | (2018.01) |
| ***F21S 41/148*** | (2018.01) |
| *F21S 41/29* | (2018.01) |

(52) U.S. Cl.
CPC ........... *F21S 41/255* (2018.01); *F21S 41/321* (2018.01); *F21S 41/365* (2018.01); *F21S 41/43* (2018.01); *F21S 41/295* (2018.01)

(56) References Cited

U.S. PATENT DOCUMENTS

| | | | | |
|---|---|---|---|---|
| 1,598,563 | A * | 8/1926 | Ducate .................. | F21S 41/322<br>362/304 |
| 8,348,486 | B2 | 1/2013 | Nakada | |
| 8,746,941 | B2 | 6/2014 | Yamagata et al. | |
| 9,316,374 | B2 * | 4/2016 | Owada .................. | F21S 41/338 |
| 9,423,088 | B2 * | 8/2016 | Park ...................... | F21S 41/143 |
| 9,644,811 | B2 * | 5/2017 | Tajinna ................. | F21S 41/147 |
| 9,709,236 | B2 * | 7/2017 | Kato ...................... | B22D 19/00 |
| 9,810,396 | B2 * | 11/2017 | Kanayama .............. | F21S 41/19 |
| 10,018,318 | B2 * | 7/2018 | Luo ......................... | F21S 41/25 |
| 10,024,514 | B2 * | 7/2018 | Kanayama ............ | F21S 41/143 |
| 2010/0110715 | A1 * | 5/2010 | Nakada ................. | F21S 41/147<br>362/538 |
| 2016/0186954 | A1 * | 6/2016 | Han ........................ | F21S 41/43<br>362/509 |
| 2018/0142858 | A1 * | 5/2018 | Huang .................. | F21S 41/192 |

* cited by examiner

VEHICULAR HEADLAMP HAVING SHADE ELEMENT WITH REFLECTIVE PORTIONS

This application claims priority for Taiwan patent application no. 106104311 filed on Feb. 9, 2017, the content of which is incorporated by reference in its entirety.

BACKGROUND OF THE INVENTION

Field of the Invention

The present invention relates to a vehicular lamp, particularly to a vehicular lamp having shade element with reflective portions.

Description of the Related Art

A vehicle is provided with various lamps, such as headlamps, parking lamps, indicators, tail lamps, and stop lamps. According the requirement of a driver, the lamps emit light beams with different color or different brightness to warn pedestrians or drivers of other vehicles against positions and directions of oncoming vehicles. Especially at night, vehicular headlamps have to be turned on at all times. Thus, the vehicular headlamps provide a bright road for the driver in a dark or unclear environment.

Refer to FIG. 1. FIG. 1 shows a shade 10 of a vehicular headlamp in the conventional technology. Traffic regulations require light projected by a vehicular headlamp to suppress glare against oncoming vehicles and have a certain level of brightness of a self-lane. As a result, the shade 10 has a special shape. One side 102 of the upper surface of the shade 10 is lower than the other side 104 of upper surface of the shade 10. The special shape is used to shade light. Refer to FIG. 2. The shade 10 is installed in a vehicular headlamp module 1 and located at the front side of a heat-dissipating substrate 12. A light source 14 emits light to a reflector 16, and then the reflector 16 reflects the light to a projection lens set 18 through the shade 10. The projection lens set 18 refracts the light and projects it on an environment outside a vehicle, so as to form a light-distributed pattern that complies with regulations.

Although the conventional vehicular headlamp forms a light-distributed pattern that complies with regulations, the reflector 16 reflects a part of the light to the heat-dissipating substrate 12 and the shade 10, such that the light is blocked to produce spray light that cannot form the light-distributed pattern, as shown in FIG. 2. Thus, the light-distributed pattern is imperfect in light intensity. Although the light-distributed pattern can reduce glare against an opposite lane, the light-distributed pattern degrades recognition for vehicles in the opposite lane and lowers the light intensity of a self-lane.

In U.S. Pat. No. 8,348,486, a vehicular headlamp and a light-distributed pattern produced thereof are needed to comply with regulations of vehicular headlamps and improve recognition for vehicles in an opposite lane since the headlamp can effectively control light intensity. The vehicular headlamp of the patent includes a projection lens, a light source, a reflector, and a shade. The reflective surface of the reflector reflects direct light emitted by the light source. A part of the direct light is emitted to the projection lens. The shade blocks a part of the reflected light and reflects it to the projection lens to supplement light and improve recognition for vehicles in an opposite lane. However, the patent can provides a supplemental light function rather than a shading function. In this patent, too strong supplemental light produces glare against oncoming vehicles. Thus, the patent cannot reduce glare against oncoming vehicles. In U.S. Pat. No. 8,746,941, the disclosed structure is used to prevent from glare against oncoming vehicles. Nevertheless, a cut-off line of a light-distributed pattern formed by the structure is unclear, such that road recognition for a self-driver is reduced.

In JP patent No. 3,205,502, the inventor provides a pillar structure to reduce glare and improve recognition for oncoming vehicles. However, the technology cannot effectively use light beams shaded by the pillar structure. In this patent, a substrate blocks a part of light. Thus, the brightness of a light-distributed pattern has much space to improve.

To overcome the abovementioned problems, the present invention provides a vehicular lamp having shade element with reflective portions.

SUMMARY OF THE INVENTION

The primary objective of the present invention is to provide a vehicular lamp having shade element with reflective portions, which installs a shade in a vehicular headlamp to reduce glare against oncoming vehicles and improve recognition for oncoming vehicles. When a driver turns on vehicular headlamps and drives at night, the shading module helps the driver clearly recognize oncoming vehicles.

Another primary objective of the present invention is to provide a vehicular lamp having shade element with reflective portions, which not only improves recognition for oncoming vehicles but also increases the light intensity of a self-lane. When a driver drives at night, the shading module helps the driver clearly determine whether obstructions appear in the front lane, thereby assuring the driver of the driving safety.

To achieve the abovementioned objectives, the present invention provides a vehicular headlamp, which comprises a reflector, a shade located under and fixed to the reflector, a reflection body, and a lighting element. The reflection body extends forward from a front end of the shade such that the top of the reflection body is lower than an upper surface of the shade. The reflection body has a reflective surface inclined towards the shade and a supplemental light plane inclined in a direction opposite to that of the reflective surface. The lighting element is located at the rear end of the shade, the lighting element and the upper surface of the shade are located on the same plane. The lighting element emits light towards the reflector, the reflector reflects the light to the upper surface of the shade, the reflective surface of the reflection body, and the supplemental light plane, so that a main light beam is projected towards an outside of the vehicle, and the reflective surface redirects at least a portion of light reflected by the reflector away from a lower part of the main light beam projected on an opposite lane for the vehicle, and the supplemental light plane redirects at least some of the light reflected by the reflector towards an upper part of the main light beam.

Below, the embodiments are described in detail in cooperation with the drawings to make easily understood the technical contents, characteristics and accomplishments of the present invention.

DETAILED DESCRIPTION OF THE INVENTION

During night driving, the headlamps of a vehicle having clear and bright illumination capabilities are very important. The headlamps have to comply with regulations, illuminate the front self-lane of the vehicle, reduce glare against oncoming vehicles in an opposite lane, and clearly recognize the oncoming vehicles. In order to satisfy the conditions, the present invention provides a vehicular lamp having shade element with reflective portion.

Figure 1:
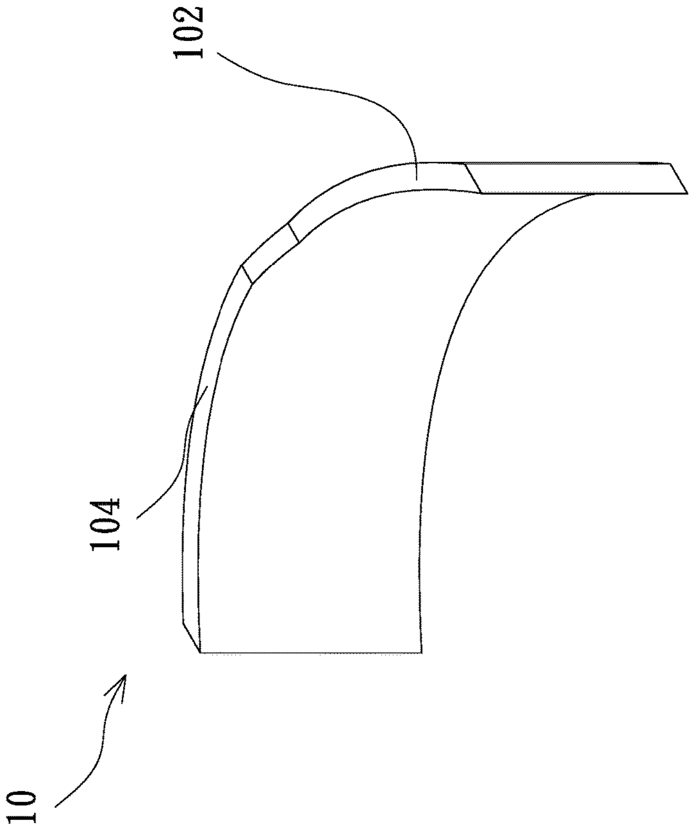
Fig. 1 (Prior Art)
FIG. 1 is a perspective view of a shade in the conventional technology.
Figure 2:
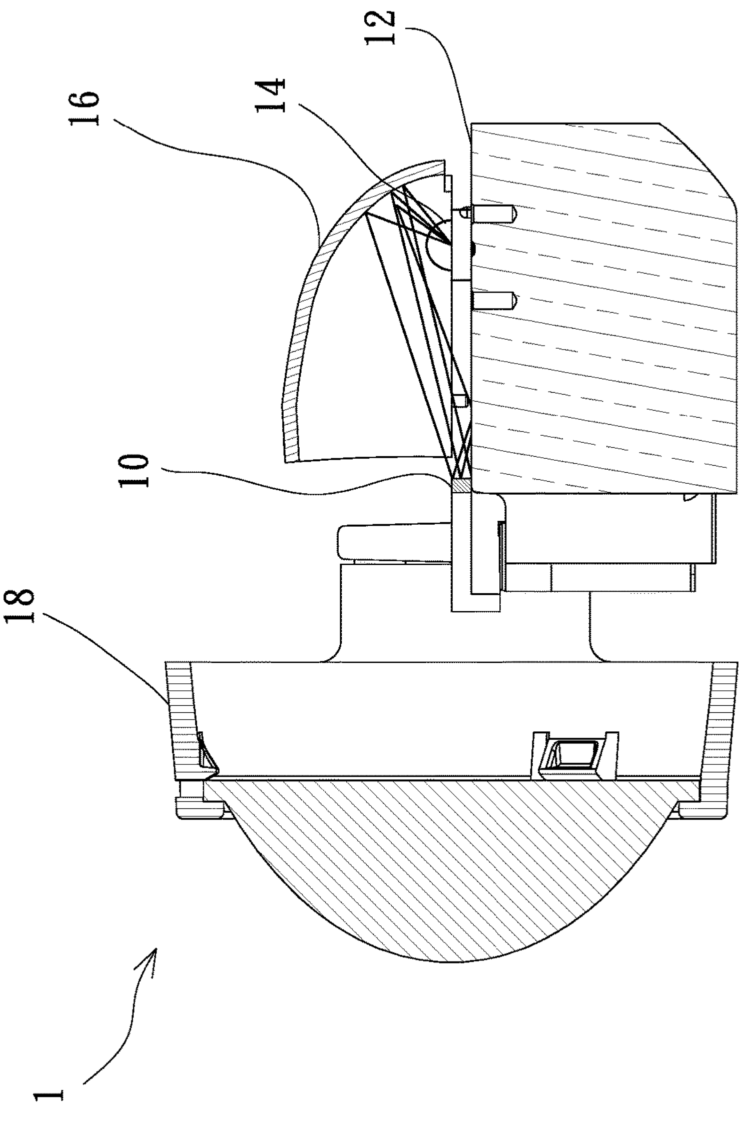
Fig. 2 (Prior Art)
FIG. 2 is a cross-sectional diagram schematically showing a vehicular headlamp module in the conventional technology.
Figure 3:
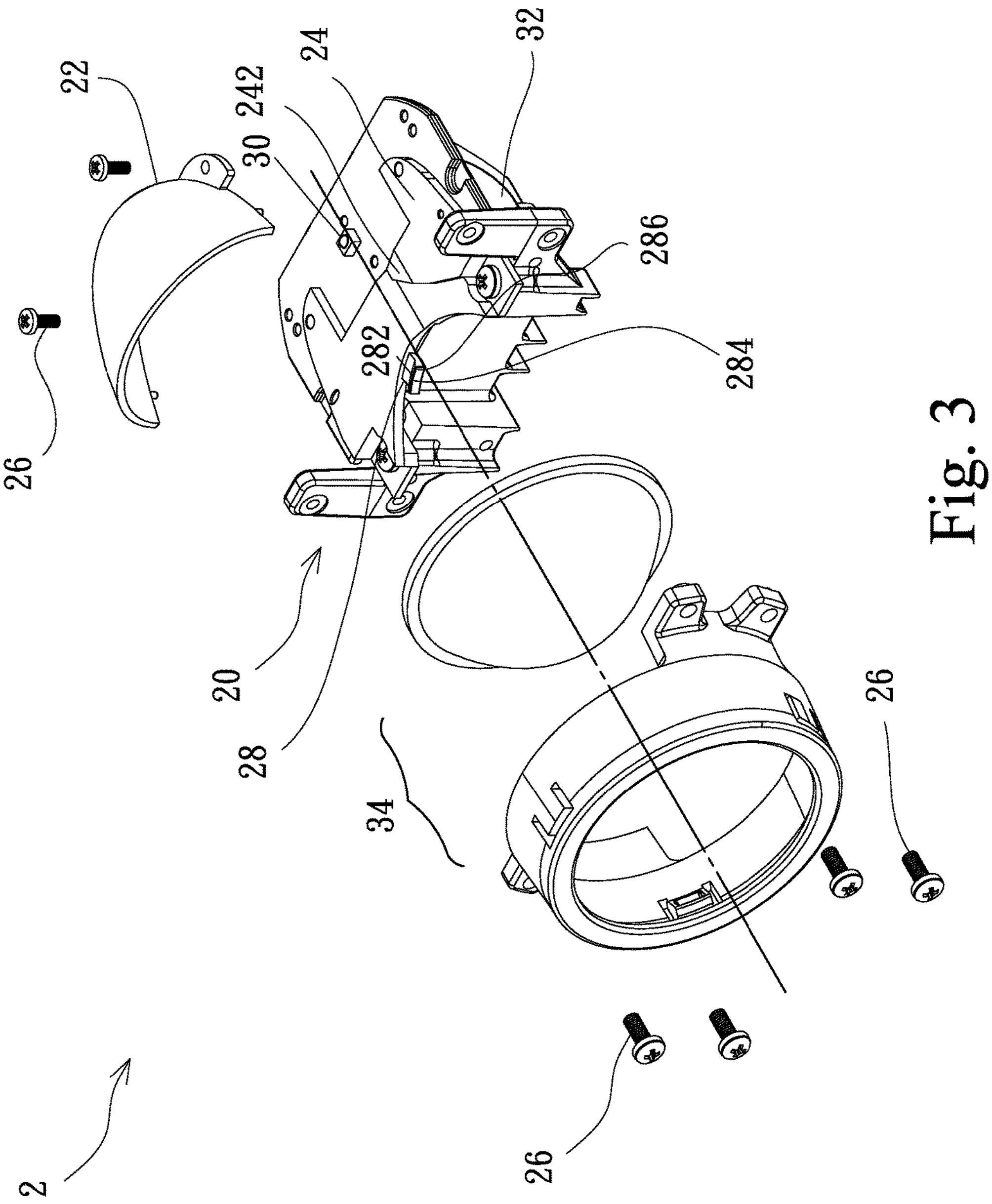
FIG. 3 is an exploded view of a lighting structure provided with a shading module for enhancing light intensity of a vehicular headlamp according to an embodiment of the present invention.
Figure 4:
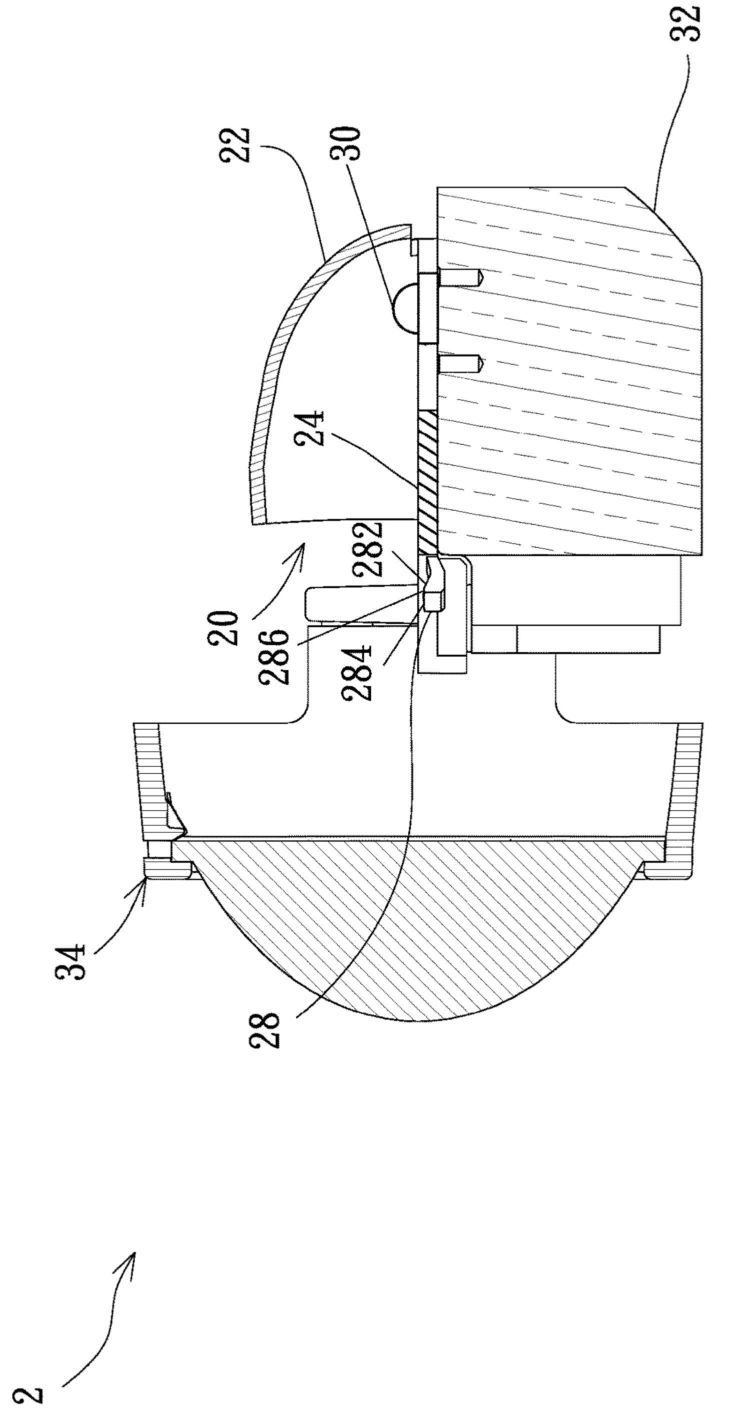
FIG. 4 is a cross-sectional diagram schematically showing a lighting structure provided with a shading module for enhancing light intensity of a vehicular headlamp according to an embodiment of the present invention.
Figure 5:
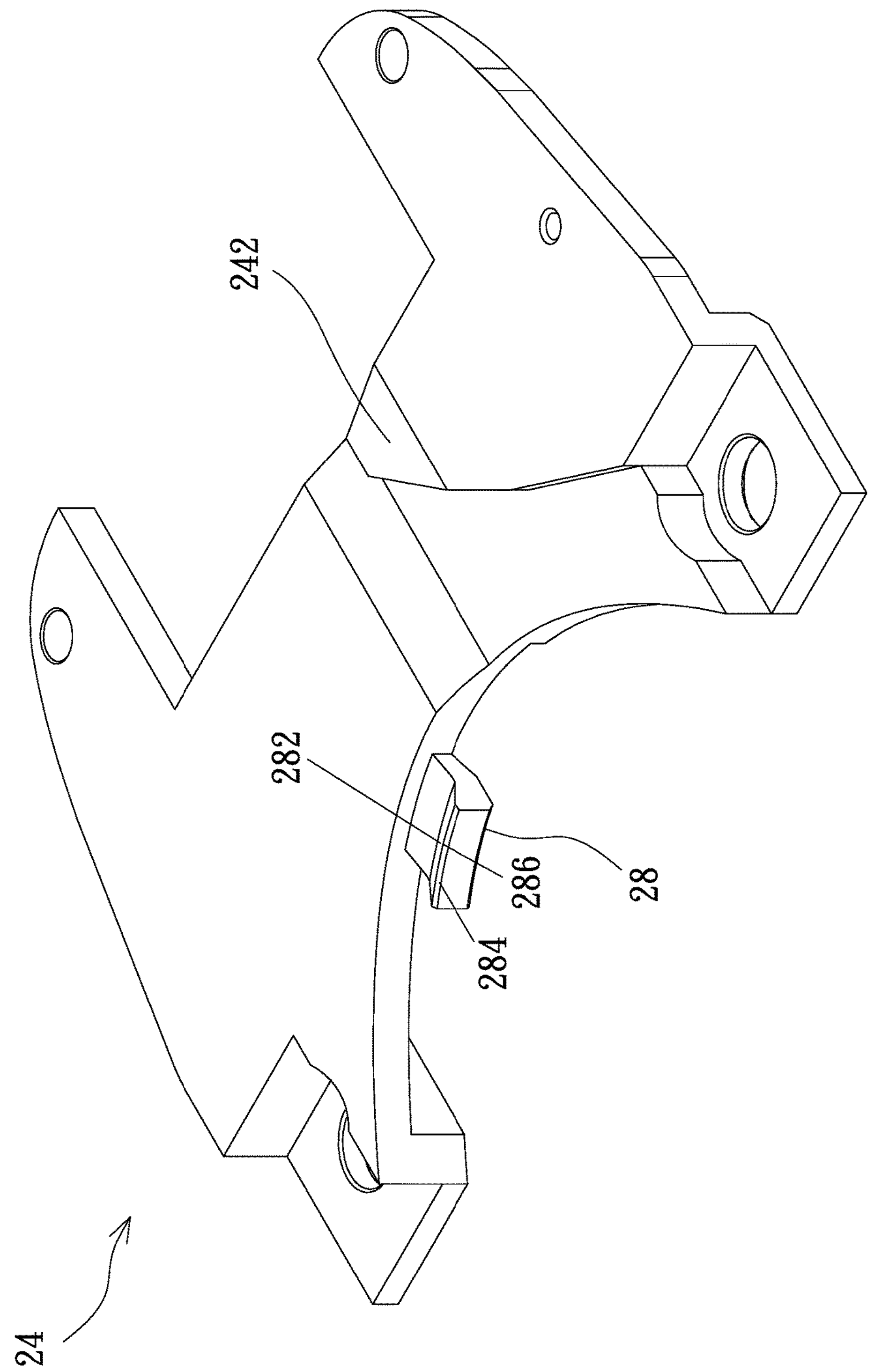
FIG. 5 is a perspective view of a shade according to an embodiment of the present invention.
Figure 6A:
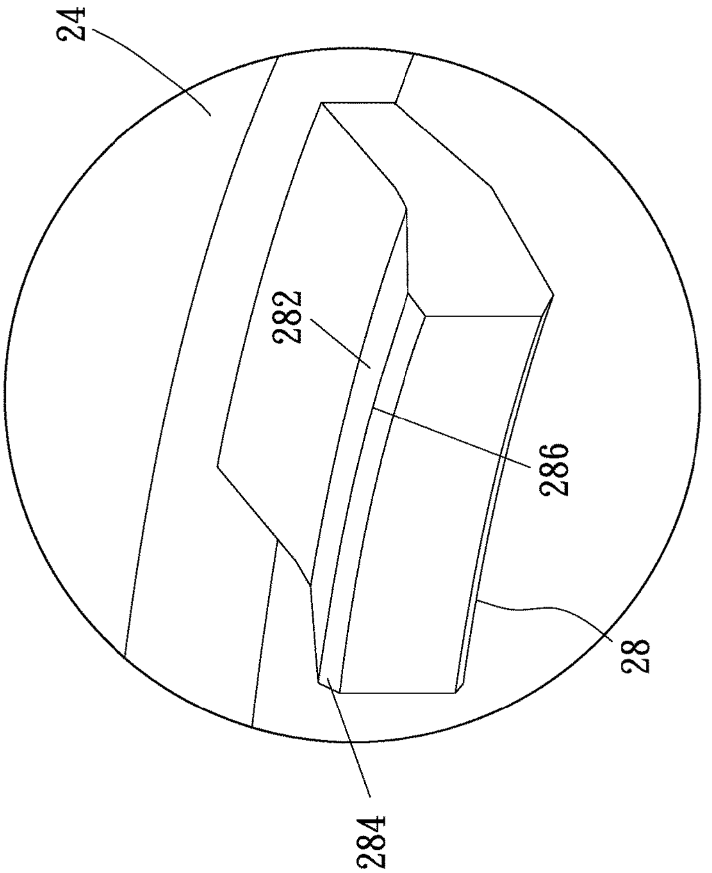
FIG. 6*a* is a perspective view of a reflection body according to an embodiment of the present invention.
Figure 6B:
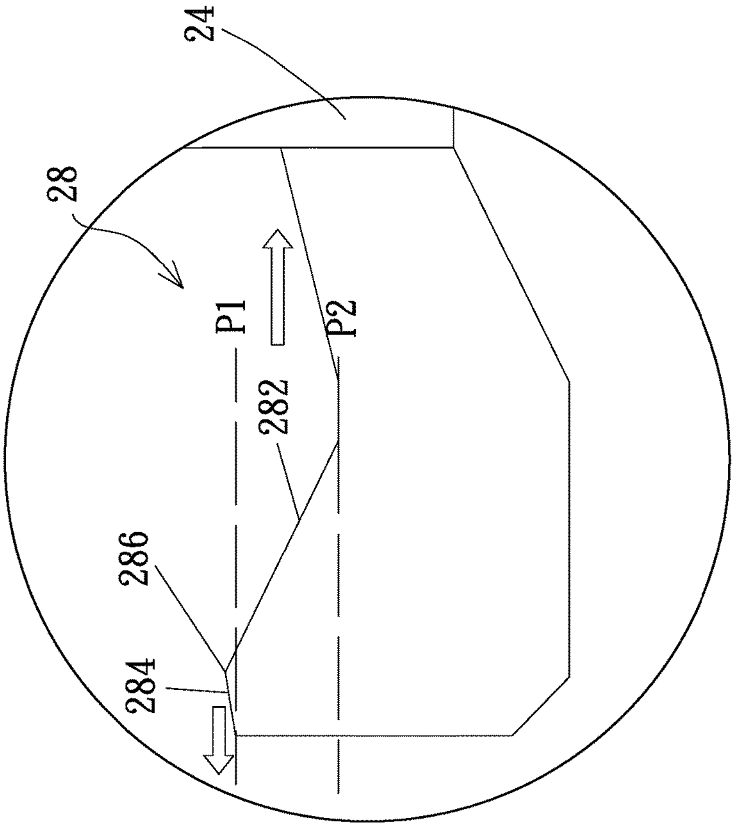
FIG. 6*b* is a side view of a reflection body according to an embodiment of the present invention.

Refer to FIG. 3, FIG. 4, and FIG. 5. A shading module 20 for enhancing light intensity of a vehicular headlamp is located under a reflector 22 of a headlamp of a vehicle. The shading module 20 comprises a shade 24 located under the reflector 22, and the rear end of the shade 24 is fixed to the reflector 22. In an embodiment, the front end of the shade 24 has a shape of an arc recessed inwardly. The upper surface of the shade downwardly tilts toward its side to form a low surface as a light-enhancing surface 242. Thus, two sides of the shade 24 have different heights. Besides, the reflector 22 is screwed to the shade 24 by screws 26. Refer to FIG. 5, FIG. 6*a*, and FIG. 6*b*. The front end of the shade 24 frontward extends to form a reflection body 28. The reflection body 28 has a reflective surface 282 and a supplemental light plane 284. The reflective surface 282 and the supplemental light plane 284 are connected with the top of the reflector 22. The reflective surface 282 tilts toward the edge of the front end of the shade 24. The reflective surface 282 and the supplemental light plane 284 tilt in two opposite directions. The reflective surface 282 tilts toward the shade 24. On the other hand, the reflective surface 282 tilts toward the interior of the vehicle. The supplemental light plane 284 tilts toward an environment outside of the vehicle. Refer to FIG. 6*b*. The supplemental light plane 284 has an inclined angle of 7~13 degrees relative to a first plane P1. The reflective surface 282 has an inclined angle of 15~35 degrees relative to a second plane P2. In the embodiment, the supplemental light plane 284 and the reflective surface 282 respectively have 9.17 degrees and 25.94 degrees, but the present invention is not limited thereto. From FIG. 4, it is observed that the height of the top of the reflection body 28 is lower than the height of the upper surface of the shade 24. In an embodiment, the top of the reflection body 28 is 0.5-3 mm below the upper surface of the shade 24. That is to say, the height of the reflection body 28 is not higher than that of the upper surface of the shade 24.

Figure 7:
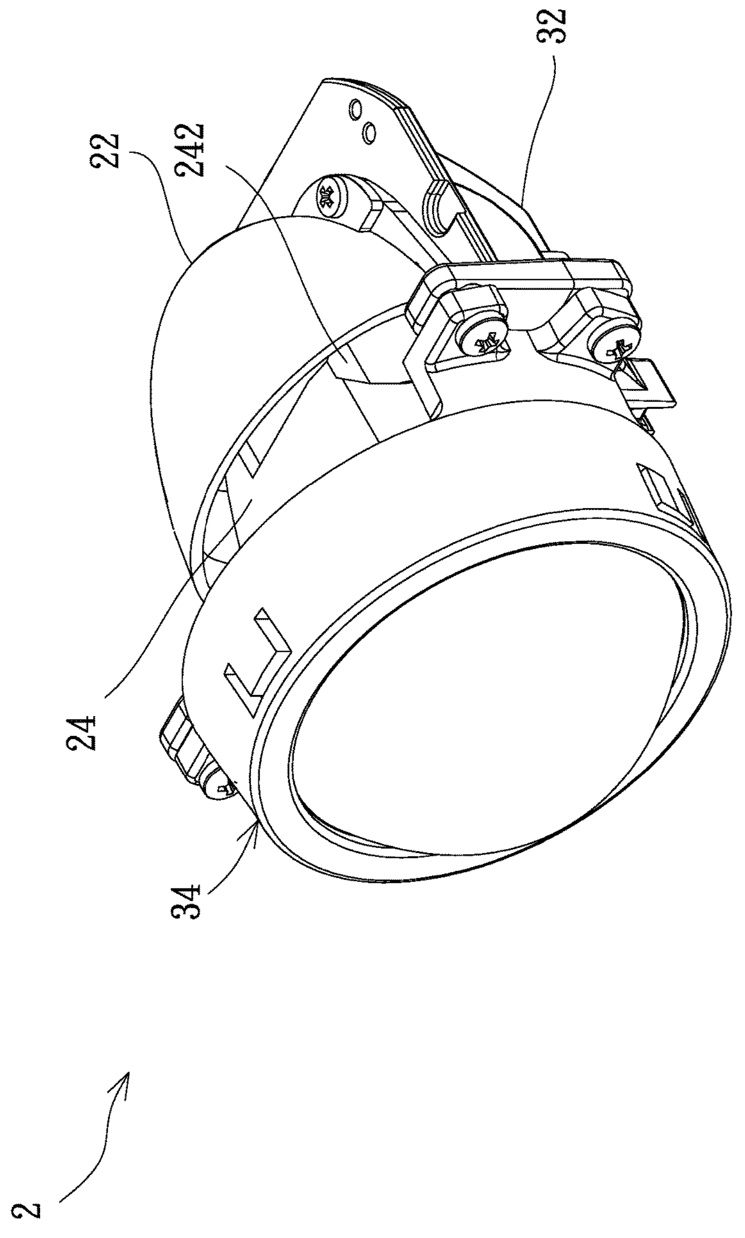
FIG. 7 is a perspective view of a lighting structure provided with a shading module for enhancing light intensity of a vehicular headlamp according to an embodiment of the present invention.

Continuing from the abovementioned paragraph, the shading module further comprises a lighting element 30 located at the rear end of the shade 24. The lighting element 30 and the upper surface of the shade 24 are located on an identical plane. In the embodiment, the lighting element 30 and the top of the upper surface of the shade 24 are located on an identical plane. The lighting element 30 and the shade 24 may be located on a heat dissipating element 32. The lighting element 30 is located at a first focus of the reflector 22 and the recess of the front end of the shade 24 is located at a second focus of the reflector 22. The heat dissipating element 32 is connected with a projection lens 34. In the embodiment, the projection lens 34 is connected with the front end of the heat dissipating element 32 by screws 26. In addition, the projection lens 34 is located at the front end of shade 24. The reflector 22, the shade 24, the reflection body 28, the lighting element 30, the heat dissipating element 32, and the projection lens 34 can form a lighting structure within the headlamp of the vehicle, as shown in FIG. 7.

Figure 8:
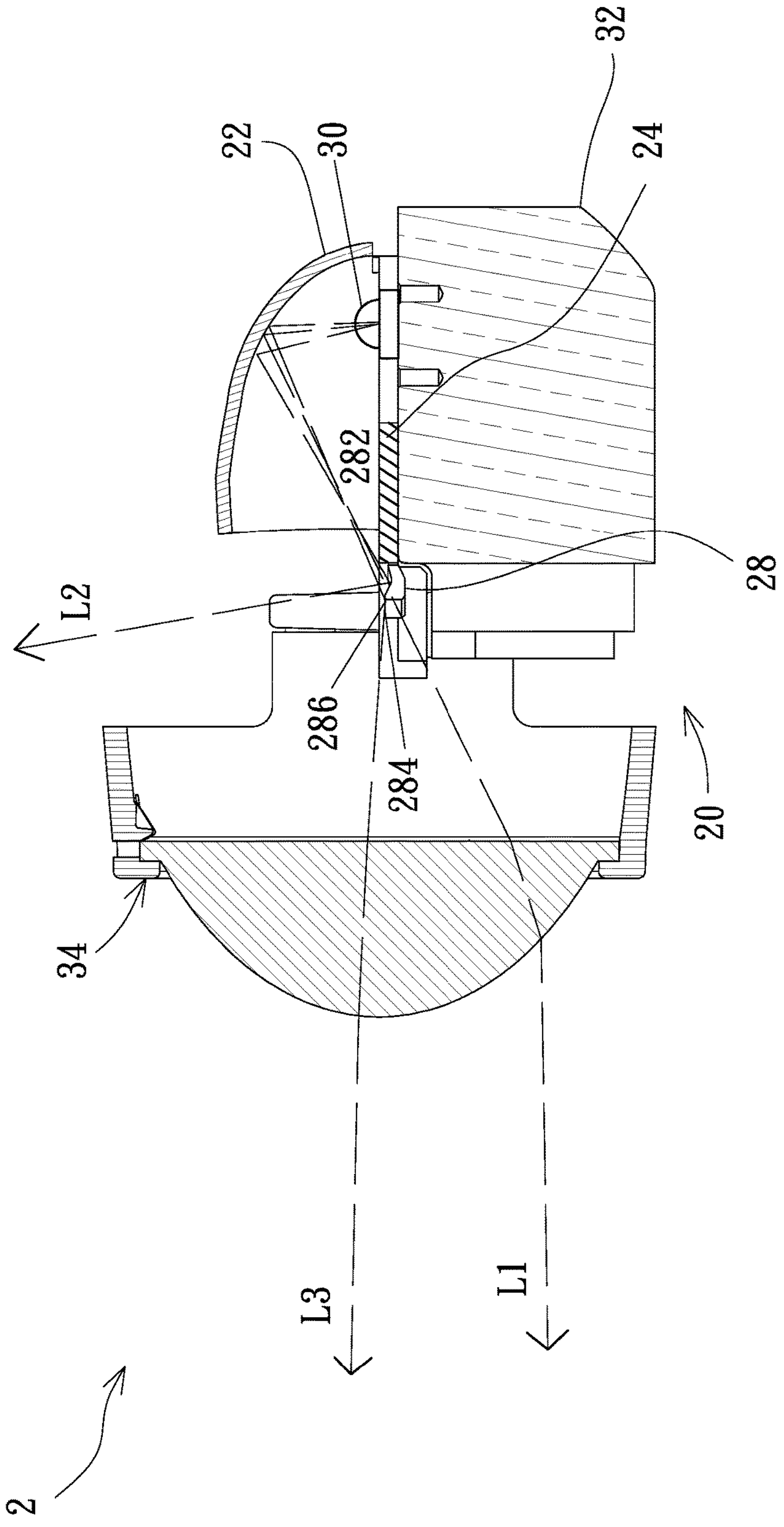
FIG. 8 is a side view of a part of light passing through the front end of a shade and a reflection body according to an embodiment of the present invention.
Figure 9:
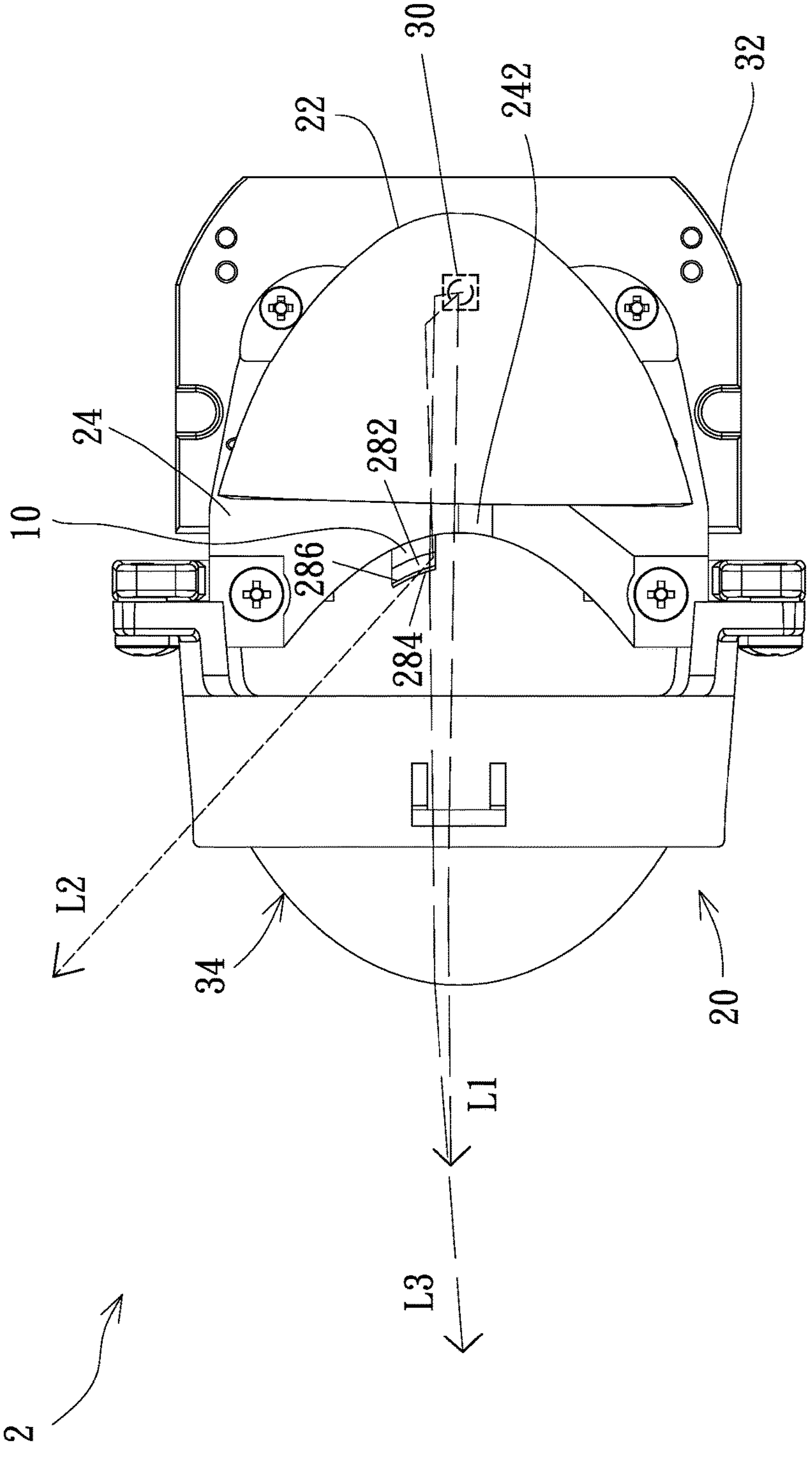
FIG. 9 is a top view of a part of light passing through the front end of a shade and a reflection body according to an embodiment of the present invention.
Figure 10:
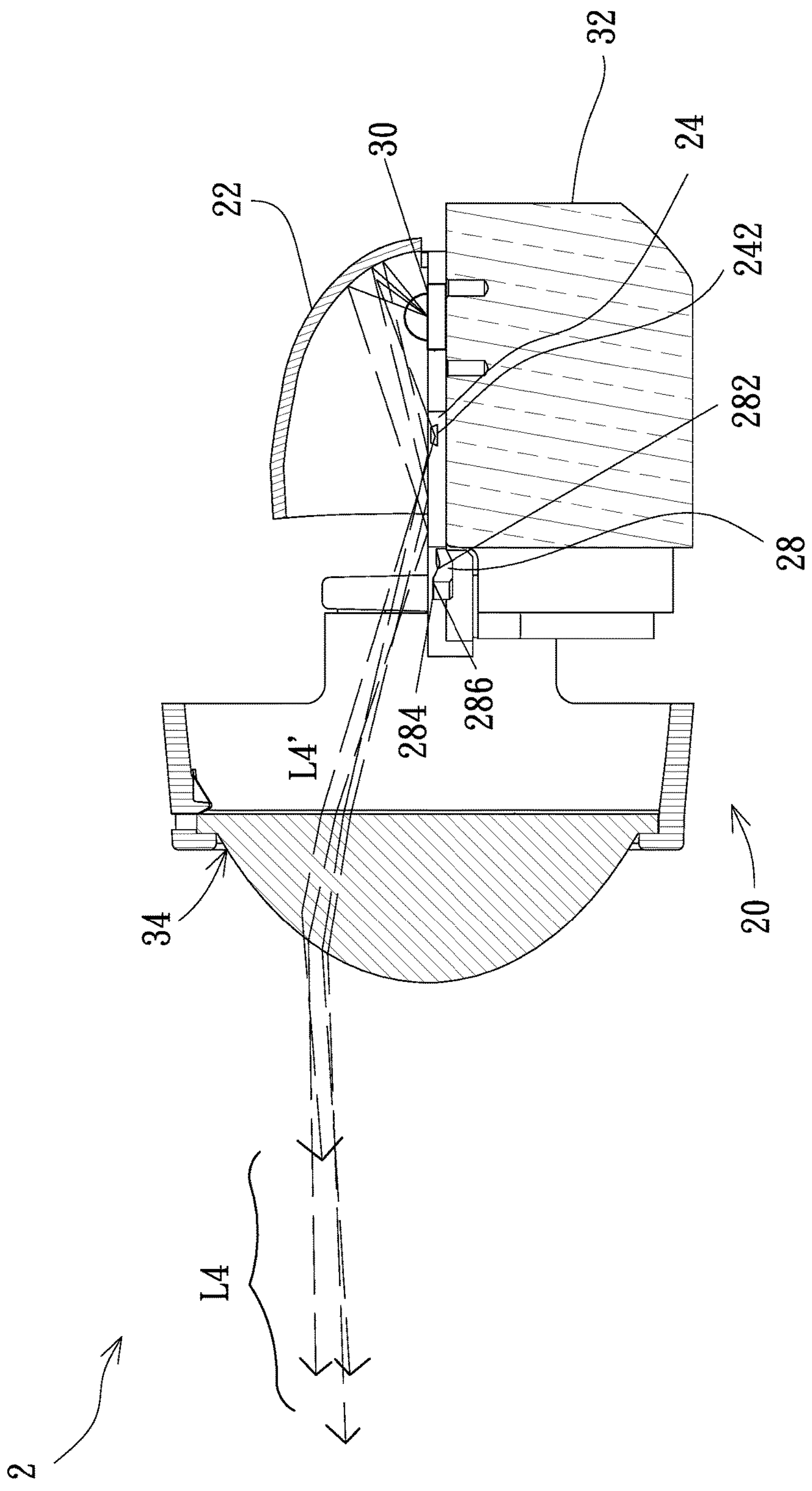
FIG. 10 is a side view of a part of light passing through a shade according to an embodiment of the present invention.
Figure 11:
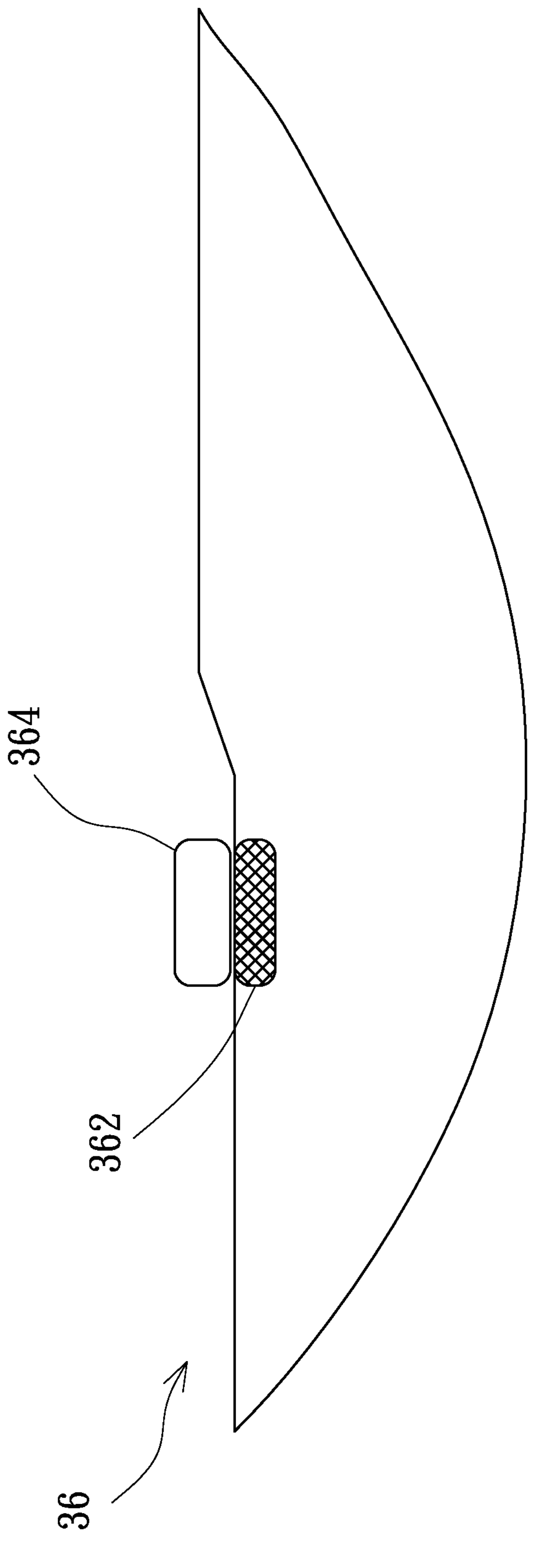
FIG. 11 is a diagram schematically showing a light-distributed pattern according to an embodiment of the present invention.

After explaining the structure and connection relationship thereof of the present invention, the practical operation of the present invention is explained. Refer to FIG. 8, FIG. 9, and FIG. 10. The lighting element 30 emits light to the inner side of the reflector 22. The reflector 22 reflects the light to the shade 24, the reflective surface 282 of the reflection body 28, and the supplemental light plane 284. As shown in FIG. 8 and FIG. 9, when the light is emitted toward the reflection body 28, a partial light beam L1 not reflected by the reflection body 28 is directly emitted to the projection lens 34, such that the projection lens 34 refracts the partial light beam L1 outward. When the light is emitted to the reflective surface 282 of the reflection body 28, a partial light beam L2 is reflected by the reflective surface 282 and upward emitted to eliminate a part of the light reflected by the reflection body 28. The supplemental light plane 284 reflects a partial light beam L3 to the projection lens 34, such that the projection lens 34 refracts the partial light beam L3 outward. As shown in FIG. 10, the lighting element 30 and the shade 24 are located on the same plane. Thus, the light reflected by the reflector 22 is not blocked. The shade 24 reflects a partial light beam L4 to the projection lens 34, such that the projection lens 34 refracts the partial light beam L4 outward. The partial light beams L1, L3, and L4 can form a main light beam projected. A light beam L4' is a part of the partial light beam L4. The light-enhancing surface 242 of the shade 24 reflects the light beam L4' to enhance the light intensity of the main light beam. The partial light beams L1, L3, and L4 represent a part of the light reflected to the reflective surface 282 of the reflection body 28, the supplemental light plane 284, and the upper surface of the shade 24. The present invention uses the reflection and refraction of the partial light beams L1, L3, and L4 to explain paths of light beams. After all the light is reflected from the reflector 22 to the reflective surface 282 of the reflection body 28, the supplemental light plane 284, and the upper surface of the shade 24 and then refracted by the projection lens 34, the projection lens 34 projects a light-distributed pattern 36 on an environment outside the vehicle. The shape of the light-distributed pattern 36 is shown in FIG. 11. The partial energy of the light-distributed pattern 36 comes from light beams reflected from the reflector 22 to the projection lens 34 through the whole area of the upper surface of the shade 24. As shown in FIG. 8, since the reflective surface 282 of the reflection body 28 eliminates the partial light beam L2, the reflective surface 282 reduces the light intensity of a lower part of the main light beam projected on an opposite lane for the vehicle, so as to form a darkness area 362 of the light-distributed pattern 36. From FIG. 8 and FIG. 10, it is known that the height of the partial light beam L3 is higher than that of the partial light beam L4. In other words, after the projection lens 34 refracts the partial light beam L3 reflected by the supplemental light plane 284 of the reflection body 28, the supplemental light plane 284 enhances the light intensity of an upper part of the main light beam, so as to form a lightness area 364 of the light-distributed pattern 36. The darkness area 362 can reduce glare against oncoming vehicles in an opposite lane. The lightness area 364 can improve recognition for the vehicles. Due to the light emitted by the lighting element 30 or reflected to the shade 24, too much heat is generated. The heat dissipating element 32 located under the shade 24 and the lighting element 30 dissipates the heat generated by the lighting element 30.

Figure 12:
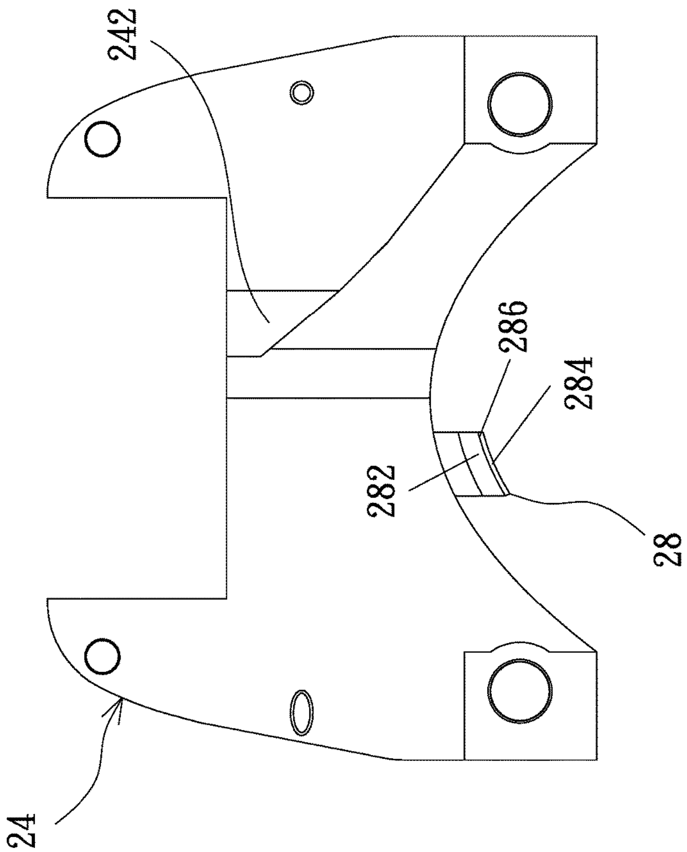
FIG. 12 is a top view of a shade according to an embodiment of the present invention.

Refer to FIG. 12. FIG. 12 is a top view of the shade 24. In Taiwan, the driving position of a vehicle is located at the left. Thus, the reflection body 28 is located at the front end of the shade 24 and located at a center-left position of the shade 24, as shown in FIG. 12. The shade 24 tilts from left to right. The light-enhancing surface 242 is located at a center-right position of the shade 24. The position of the shade 24 corresponds to the left driving position. In a country that the driving position of a vehicle is located at the right, the structure of the shade is contrarily designed.

Figure 13A:
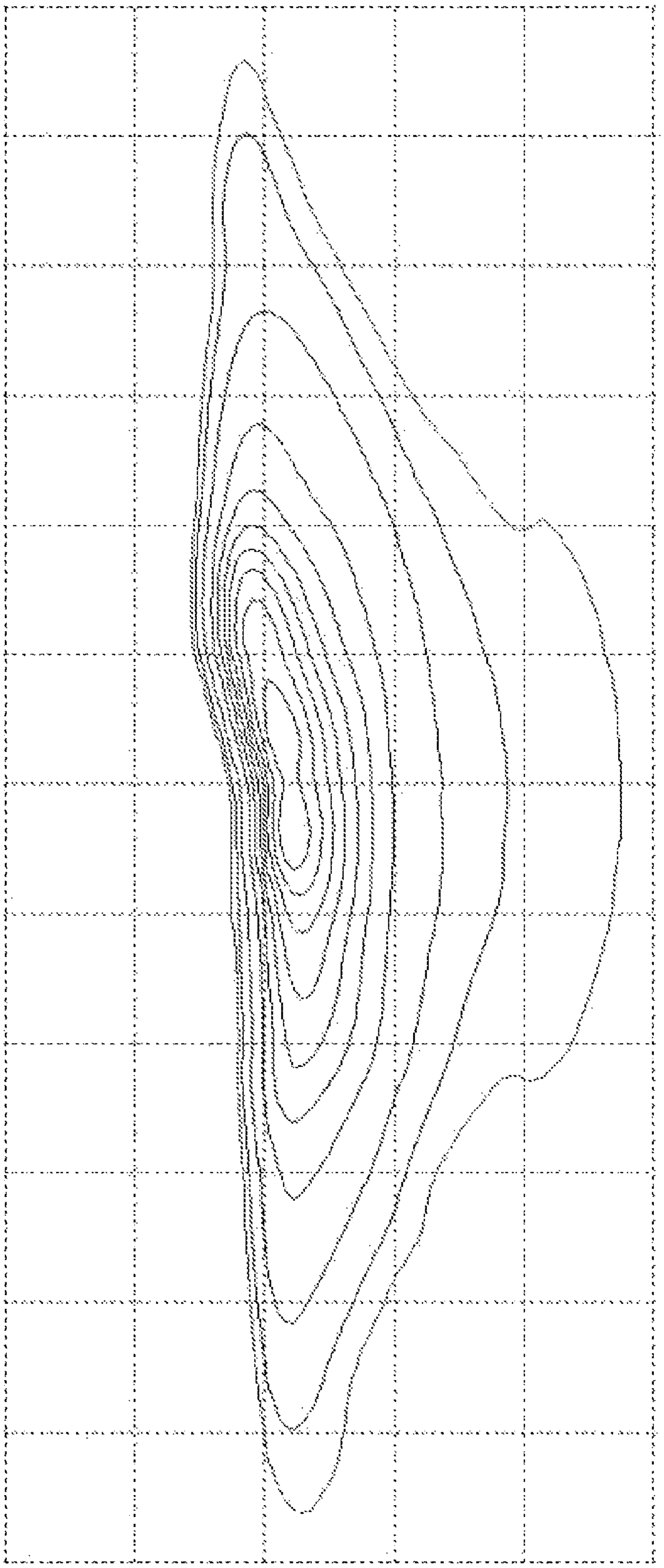
FIG. 13*a* is a diagram schematically showing light intensity distribution after experiment of the present invention.
Figure 13B:
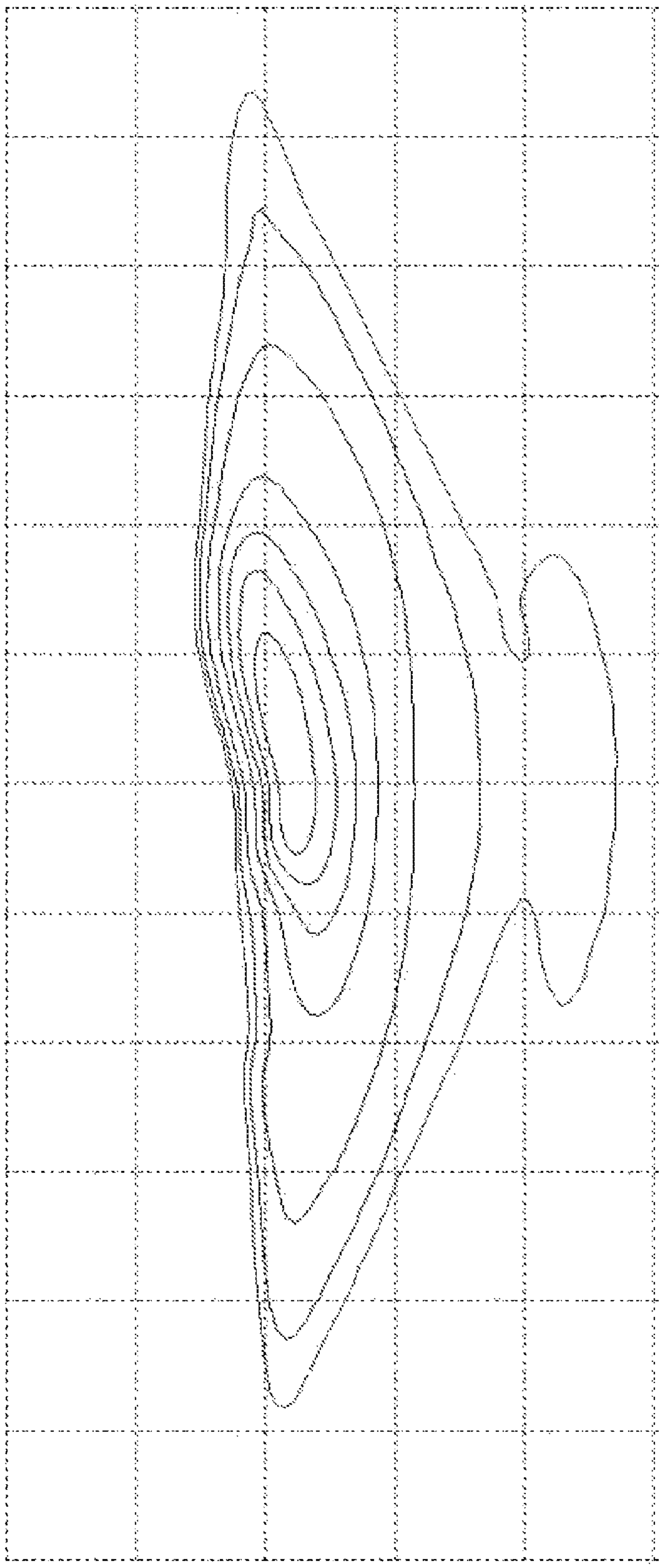
Fig. 13b (Prior Art)
FIG. 13*b* is a diagram schematically showing light intensity distribution after experiment in the conventional technology.

The shade of the present invention is different from the conventional shade. In the conventional technology, the shade is close to the projection lens. In the present invention, the lighting element and the shade are located on an identical plane whereby the light is effectively reflected. Thus, the light intensity of the light refracted by the projection lens is higher than the light intensity of the conventional technology. According to the abundant experience of the inventor of the present invention and practical experiment, a comparison result is obtained. Refer to FIG. 13*a* and FIG. 13*b*. FIG. 13*a* is a diagram schematically showing the light intensity distribution of a shade at 25 meters of the present invention, wherein the luminous flux is 586 lumens and the highest light intensity is 19539 cd. FIG. 13*b* is a diagram schematically showing the light intensity distribution of a shade at 25 meters in the conventional technology, wherein the luminous flux is 409 lumens and the highest light intensity is 12294 cd. According to the comparison of FIG. 13*a* to FIG. 13*b*, the shade of the present invention is superior to the conventional technology. When a vehicle drives at night, the light intensity of the present invention is stronger and helpful in recognizing the front road.

Consequently, the present invention reduces glare against oncoming vehicles in the opposite lane, uses the reflection body and the shade to enhance recognition for the vehicles, and uses the shade to produce a clear light beam to help night driving, thereby improving the safety of a self-driver and pedestrians.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A vehicular headlamp comprising:

a reflector;

a shade located under and fixed to the reflector;

a reflection body extending forward from a front end of the shade such that the top of the reflection body is lower than an upper surface of the shade, the reflection body having a reflective surface inclined towards the shade and a supplemental light plane inclined in a direction opposite to that of the reflective surface; and a lighting element located at the rear end of the shade, the lighting element and the upper surface of the shade are located on the same plane, wherein the lighting element emits light towards the reflector, the reflector reflects the light to the upper surface of the shade, the reflective surface of the reflection body, and the supplemental light plane, so that a main light beam is projected towards an outside of the vehicle, and the reflective surface redirects at least a portion of light reflected by the reflector away from a lower part of the main light beam projected on an opposite lane for the vehicle, and the supplemental light plane redirects at least some of the light reflected by the reflector towards an upper part of the main light beam.

2. The vehicular headlamp of claim 1, wherein at least a portion of the upper surface of the shade is inclined downwardly toward a side of the shade, to form a low surface.

3. The vehicular headlamp of claim 1, wherein the top of the reflection body is 0.5-3 mm below the upper surface of the shade.

4. The vehicular headlamp of claim 1, wherein the supplemental light plane of the reflection body is tilted at an angle of 7-13 degrees relative to the upper surface of the shade.

5. The vehicular headlamp of claim 1, wherein the reflective surface of the reflection body is tilted at an angle of 15-35 degrees relative to the upper surface of the shade.

6. The vehicular headlamp of claim 1, wherein the lighting element is a light-emitting diode (LED).

7. The vehicular headlamp of claim 1, wherein the front end of the shade has a concave shape.

8. The vehicular headlamp of claim 7, wherein the shade further comprising a recess formed at the front end of the shade, and the lighting element is located at a first focus of the reflector and the recess is located at a second focus of the reflector.

9. The vehicular headlamp of claim 1, further comprising a heat dissipating element located under the shade and the lighting element to dissipate heat generated by the lighting element.

10. The vehicular headlamp of claim 9, further comprising a projection lens set connected with the heat dissipating element, the projection lens configured to receive light reflected from the upper surface of the shade, the reflective surface of the reflection body, and the supplemental light plane, to project the main light beam towards the outside of the vehicle.

* * * * *